United States Patent
Mandyam et al.

(10) Patent No.: US 8,645,208 B2
(45) Date of Patent: *Feb. 4, 2014

(54) SYSTEMS AND METHODS FOR PROVIDING AUTOMATIC REMINDERS FOR SAVED ADVERTISEMENTS

(75) Inventors: Srinivas A. Mandyam, San Jose, CA (US); Krishna Vedati, Sunnyvale, CA (US); David Lothele Williams, Belmont, CA (US)

(73) Assignee: Yellowpages.com LLC, Glendale, CA (US)

(*) Notice: Subject to any disclaimer, the term of this patent is extended or adjusted under 35 U.S.C. 154(b) by 72 days.

This patent is subject to a terminal disclaimer.

(21) Appl. No.: 12/968,214

(22) Filed: Dec. 14, 2010

(65) Prior Publication Data

US 2012/0150620 A1  Jun. 14, 2012

(51) Int. Cl.
*G06Q 30/00* (2012.01)
(52) U.S. Cl.
USPC ............................................. 705/14.49
(58) Field of Classification Search
USPC ........................................................ 705/14
See application file for complete search history.

(56) References Cited

U.S. PATENT DOCUMENTS

| | | | |
|---|---|---|---|
| 7,302,696 B1* | 11/2007 | Yamamoto | 725/23 |
| 7,403,908 B1 | 7/2008 | Jaramillo | |
| 7,693,752 B2 | 4/2010 | Jaramillo | |
| 8,472,985 B2* | 6/2013 | Karmarkar | 455/466 |
| 2002/0116271 A1* | 8/2002 | Mankoff | 705/14 |
| 2006/0253453 A1* | 11/2006 | Chmaytelli et al. | 707/10 |
| 2008/0221997 A1* | 9/2008 | Wolfe | 705/14 |
| 2009/0037296 A1 | 2/2009 | Jaramillo | |
| 2009/0157513 A1* | 6/2009 | Bonev et al. | 705/14 |
| 2009/0274278 A1* | 11/2009 | Haldeman | 379/88.13 |
| 2010/0058246 A1* | 3/2010 | Bedingfield, Sr. | 715/844 |
| 2010/0094689 A1* | 4/2010 | Fodor | 705/14.1 |
| 2010/0103779 A1* | 4/2010 | Kakirde et al. | 368/10 |
| 2010/0262464 A1* | 10/2010 | Monteforte et al. | 705/10 |
| 2011/0093320 A1* | 4/2011 | Blake et al. | 705/14.16 |
| 2011/0106613 A1* | 5/2011 | Felt et al. | 705/14.46 |
| 2011/0208575 A1* | 8/2011 | Bansal et al. | 705/14.25 |
| 2011/0276383 A1* | 11/2011 | Heiser et al. | 705/14.25 |
| 2011/0282725 A1* | 11/2011 | Chatterjee et al. | 705/14.24 |
| 2012/0054010 A1* | 3/2012 | Bouta et al. | 705/14.16 |
| 2012/0072270 A1* | 3/2012 | Waylonis et al. | 705/14.1 |
| 2012/0109781 A1* | 5/2012 | Felt et al. | 705/26.41 |
| 2012/0116881 A1* | 5/2012 | Billings | 705/14.55 |
| 2012/0123839 A1* | 5/2012 | Blake et al. | 705/14.16 |
| 2012/0150601 A1* | 6/2012 | Fisher | 705/14.23 |
| 2012/0220314 A1* | 8/2012 | Altman et al. | 455/456.3 |
| 2012/0265604 A1* | 10/2012 | Corner et al. | 705/14.39 |
| 2013/0143533 A1* | 6/2013 | Carlson et al. | 455/412.1 |

* cited by examiner

*Primary Examiner* — Matthew L Hamilton
(74) *Attorney, Agent, or Firm* — Kilpatrick Townsend & Stockton LLP (57) ABSTRACT

Methods, machine-readable media, apparatuses and systems provide reminders about saved electronic advertisements. A plurality of electronic advertisements selected by a user to be saved is stored. Content of the plurality of electronic advertisements is analyzed. Contextual factors to determine whether at least one predetermined rule is satisfied are assessed. Satisfaction of the predetermined rule is determined. An electronic advertisement from the plurality of electronic advertisements based on satisfaction of the predetermined rule is identified. A reminder about the electronic advertisement is provided to a device of the user. The electronic advertisements may include any type of incentive or offer, including coupons.

16 Claims, 8 Drawing Sheets

FIGURE 8

SYSTEMS AND METHODS FOR PROVIDING AUTOMATIC REMINDERS FOR SAVED ADVERTISEMENTS

BACKGROUND

1. Field

At least some embodiments of the disclosure relate generally to the field of advertisements and, more particularly but not limited to, providing automatic reminders about saved electronic advertisements.

2. Description of the Related Art

Advertisements may be delivered to users to incentivize certain commercial action. Electronic coupons and offers are types of such advertisements.

BRIEF DESCRIPTION OF THE DRAWINGS

These and other features, aspects, and advantages will become better understood with regard to the following description, appended claims, and accompanying drawings where:

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" or "some embodiments" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Features of embodiments that are herein expressly or impliedly described as one of methods, machine-readable media, apparatuses, or systems should be understood to also describe the other of methods, machine-readable media, apparatuses, or systems. For example, embodiments describing features of an apparatus or system should be understood to also describe a method involving the features and a machine-readable media involving the features.

Traditional display advertisements may be used to increase brand recognition or result in a desired conversion. Conversion may include, for example, a click through and resulting purchase, or a click through and resulting addition to an email list that may lead to a later purchase. Electronic display advertisements, such as a banner advertisement, however, may be displayed for only a brief duration of time (e.g., 30 seconds) and then disappear. If a consumer does not respond to the display advertisement quickly, the opportunity posed by the display advertisement may be lost. Further, even if the consumer is able to save or otherwise collect the display advertisement, such as a coupon, the consumer still may forget to use the coupon or otherwise neglect to use the coupon at the appropriate time or place.

Embodiments of the disclosure includes methods, machine-readable media, apparatuses and systems to provide automatic reminders about saved electronic advertisements. A plurality of electronic advertisements selected by a user to be saved is stored. Content of the plurality of electronic advertisements is analyzed. Contextual factors to determine whether at least one predetermined rule is satisfied are assessed. Satisfaction of the predetermined rule is determined. An electronic advertisement from the plurality of electronic advertisements based on satisfaction of the predetermined rule is identified. A reminder about the electronic advertisement is provided to a device of the user. The electronic advertisements may include any type of incentive or offer, including coupons.

Figure 1:
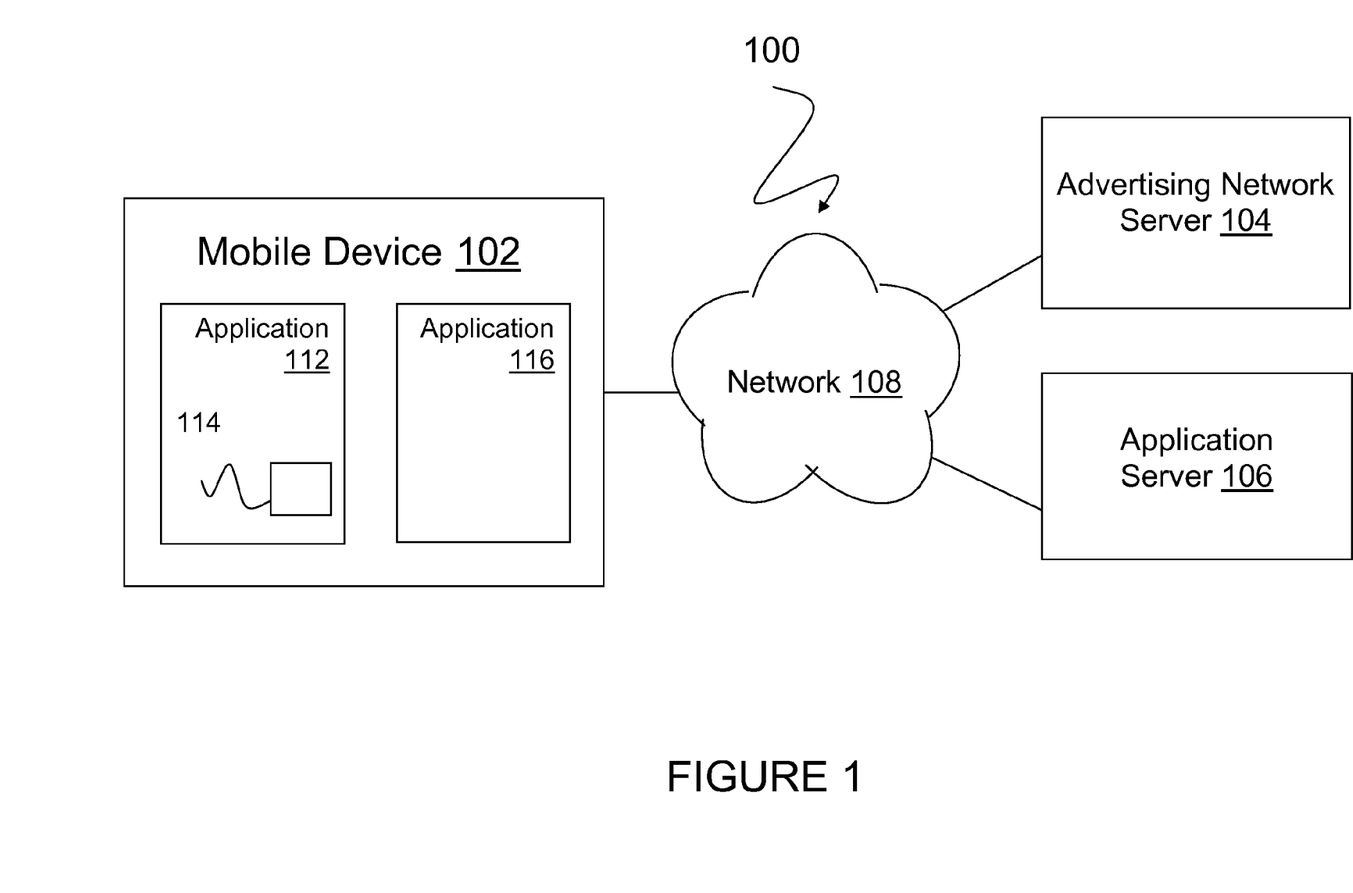
FIG. 1 is a diagram of one embodiment of a system for saving and providing advertisements.

FIG. 1 is a diagram of one embodiment of a system for saving and providing reminders about saved advertisements.

In some embodiments, a mobile device (e.g., 102) displays advertisements, such as display advertisements, to a user of the mobile device. The advertisements may be electronic. The advertisements may include coupons, offers, and other purchase or commercial incentives for the user. The advertisements may be saved by the user through an application (e.g., 116) running on the mobile device. The advertisement is provided to an application server (e.g., 106) for storage and recall by the user through the application. When running the application, the user of the mobile device may select and retrieve the stored advertisements for display on the mobile device. Further, the application may provider an automatic reminder about the stored advertisements based on predetermined rules that consider various contextual factors. Upon retrieval, the advertisement may be redeemed as desired by the user.

FIG. 1 illustrates a system 100 for saving advertisements and providing reminders about saved advertisements. The system 100 includes a mobile device 102 of a user, an advertising network server 104, an application server 106, and a network 108. The mobile device 102 communicates with the advertising network server 104 and the application server 106 over the network 108.

In one embodiment, the mobile device 102 may be, for example, a mobile phone, a mobile computer, personal digital assistant, and the like.

In one embodiment, a computing device may be used instead of or in addition to the mobile device 102. For example, the computing device may include a non-mobile computing device, such as a desk top computer.

In one embodiment, the network 108 may be the Internet. In one embodiment, the network 108 may include a local area network, a cellular telecommunications network, a wireless wide area network, a wireless local area network, a wireless personal area network, and an intranet.

In one embodiment, the advertising network server 104 may be operated or controlled by an advertising network. The advertising network may be an advertising network that is entirely or partially engaged in the delivery of advertising through electronic media. The advertising network may link advertisers to electronic publishers that want to host advertisements. The advertising network may aggregate a supply of advertising space from publishers. The advertising network then may match demand for advertising space from advertisers with the supply of advertising space from publishers. The advertising network may include any one or combination of advertising network types, such as vertical advertising networks, blind advertising networks, and targeted advertising networks.

In one embodiment, the advertising network server 104 may be distributed over many computers. In one embodiment, the application server 106 may be distributed over many computers. In one embodiment, the advertising network server 104 and the application server 106 may be integrated into one computer or a network of communicatively coupled computers.

In one embodiment, the mobile device 102 may include an application 112 that is provided by a publisher. The publisher may be any entity. The publisher may include, for example, a gaming company, a social networking company, a music vendor, a multimedia content provider, a news content provider, and the like.

The application 112 may be any computer program that can be installed and run on the mobile device 102. The application 112 may provide, for example, utility or functionality for the user of the mobile device 102. The application 112 may relate to, for example, electronic gaming, social networking, music, multimedia, news, or any other type of media or content.

The publisher of the application 112 may include a toolkit 114 of the advertising network in the application 112. In one embodiment, the toolkit 114 may be a software development kit (SDK). The toolkit 114 is provided by the advertising network in control of the advertising network server 104. The toolkit 114 may be installed in the application 112.

The toolkit 114 may include a client-side utility that communicates with the advertising network server 104 to control downloading, displaying, caching, and other operations concerning the handling of advertisements in connection with the application 112. The advertising network server 104 may provide advertisements to the user of the mobile device 102 through communication with the toolkit 114 when the user is running the application 112. The publisher may be compensated by the advertising network for allowing the display of advertisements with the application 112.

Many applications, in addition to or in place of the application 112, may be installed on the mobile device 102. Each application may have different or similar function, utility, or content from the other application. Each application may have a different or the same publisher. In one embodiment, each of a plurality of applications may include a toolkit. Advertisements may be displayed through each of the multiple applications installed on the mobile device 102 through their respective toolkits. The toolkit in each application allows the display of advertisements from an advertising network associated with the toolkit. In some embodiments, the same toolkit from an advertising network may be incorporated into applications provided by different publishers. In some embodiments, the different toolkits from an advertising network may be incorporated into applications provided by different publishers. In some embodiments, different toolkits from different advertising networks may be incorporated into applications provided by different publishers.

The advertisements displayed by the mobile device 102 may be any type of advertisement. In one embodiment, the advertisements may include electronic display advertisements. Display advertisements are a type of advertising that may contain one or any combination of images, animation, audio, video, text, logos, and similar features. The electronic display advertisements may be dynamic or static. In one embodiment, the advertisements include electronic coupons, offers, and any other types of incentives.

The advertisements displayed by the mobile device 102 may appear in a predetermined portion of the screen of the application 112 that is displayed on the mobile device 102. For example, the advertisements may appear in a certain corner of the screen of the application 112. As another example, the advertisements may appear at the top-most or bottom-most portion of the screen. As yet another example, the advertisement may appear at a changing location on the screen. In one embodiment, the publisher of the application 112 determines the location of the advertisement in the screen of the mobile device 102. In one embodiment, the advertising network in part may decide the location of the advertisement.

In one embodiment, display of advertisements is designed to minimize the impact of the advertisement on the user experience of the application 112. For example, the advertisement may be displayed to the user in a manner that does not unduly alter use of or access to the application 112. In one embodiment, the advertisement may be displayed as a pop up window separate from the screen displaying the application 112.

In one embodiment, the display of advertisements may involve a plurality of stages. The application 112 may display, for example, a series of advertisements that culminate in the display of the identity of an advertiser in the last advertisements in the series. For example, the application 112 may display a first message such as "Are you hungry?" The first message may not identify a particular advertiser. Upon selection of the first message by the user of the mobile device 102, the application 112 may display a second advertisement of an eating establishment, or a listing of advertisements of various eating establishments, that may be suitable for the user. The second advertisement may include the identity of or contact information for the eating establishment or eating establishments. Selection of the second advertisement may cause display of, for example, the website of the eating establishment or the websites of the eating establishments. In one embodiment, the determination of suitable advertisers for the user may be based on various factors, such as location, time of day, user profile, user preferences, etc.

Figure 2:
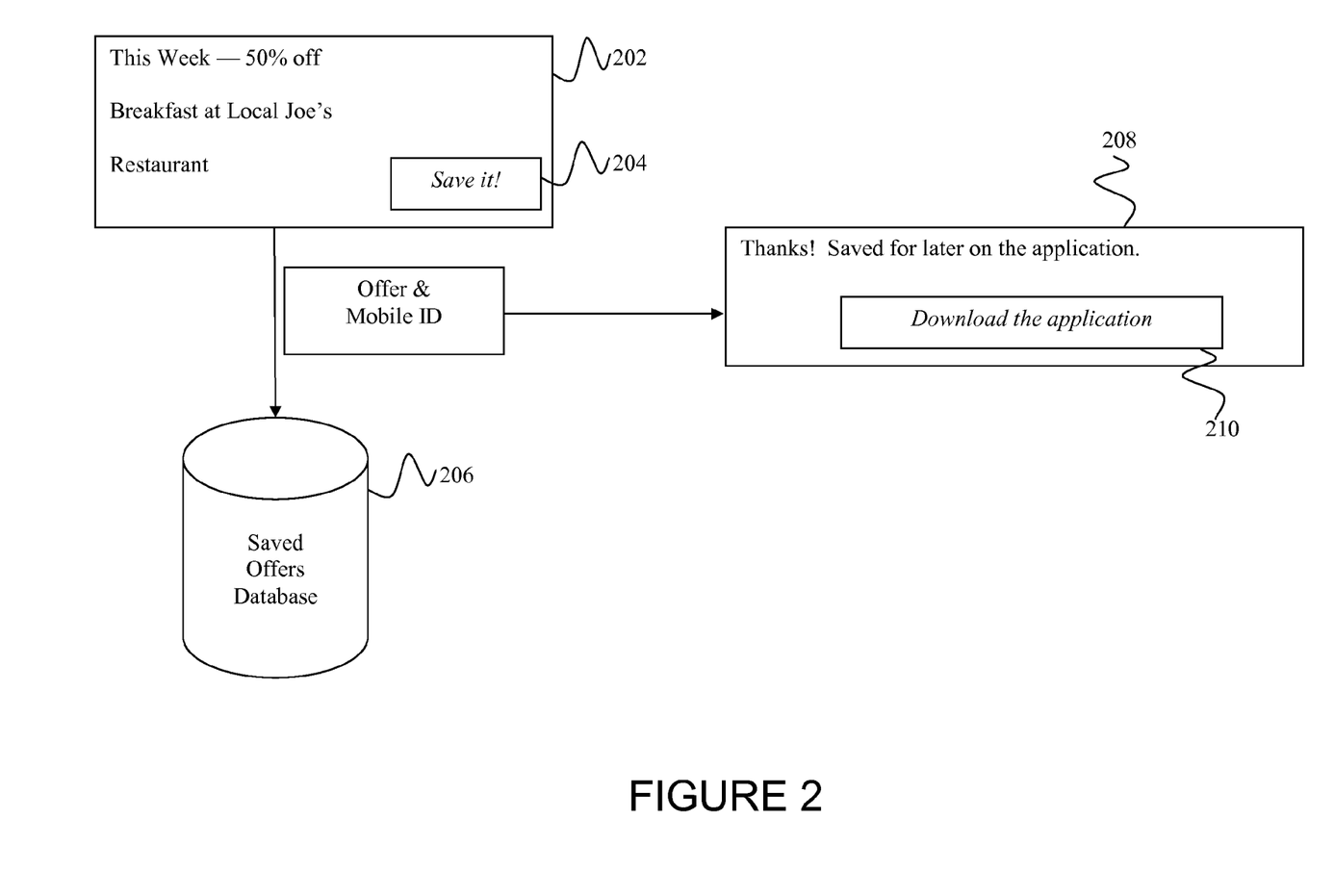
FIG. 2 is a functional diagram of one embodiment including an advertisement that may be saved.

As shown in FIG. 2, the user of the mobile device 102 may save the advertisements displayed by the application 112. In one embodiment, an advertisement 202 includes display of a save option 204 that is selectable by the user. In one embodiment, the save option 204 is displayed outside the advertisement 202 on the screen of the mobile device 102. The save option 204 may include text such as "Save it!" or another indication to the user that the advertisement 202 may be saved. The save option 204 may be selected by a mouse click or any other user selection command, as described herein.

Upon selection by the user of the save option 204, the toolkit 114 of the application 112 causes the advertisement 202 to be communicated to and saved to a database 206 of the application server 106. In one embodiment, the database 206 may be communicatively coupled to and separate from the application server 106.

The selection of an advertisement displayed with the application 112 to save the advertisement may involve any one or combination of various user inputs. For example, the advertisement may be selected by the user by pointing and clicking on the advertisement. As another example, the advertisement may be selected by an appropriate tap or movement applied to a touch screen or pad of the mobile device 102. As yet another example, the advertisement may be selected by an appropriate voice command applied to the application 112 or the mobile device 102.

In one embodiment, the publisher of the application or the advertising network associated with the toolkit implemented by the application, or both may prescribe the manner by which the user may select an advertisement to be saved. In one embodiment, the user of the mobile device may prescribe the manner by which an advertisement may be selected for storage.

In one embodiment, each advertisement saved by the user is stored individually by the application server 106. In one embodiment, the advertisements saved by the user may be organized by the application server 106 into a wallet associated with the user. The wallet may be organized according to a number of considerations and factors. In one embodiment, the user of the mobile device 102 may select the considerations and factors with which to organize the wallet. For example, the considerations and factors may include the publication date of the advertisement, the expiration date of the advertisement, the subject matter of the advertisement, the location of the advertiser of the advertisement, etc. In one embodiment, the application server 106 may maintain a profile associated with the user. The wallet of the user may be included in the profile.

In one embodiment, the advertisements saved by the user may be associated with the user based on an identifier that uniquely identifies the mobile device 102 or the user. For example, when the mobile device 102 is a mobile phone, the application server 106 may associate advertisements that the user has chosen to save with the phone number of the mobile phone of the user.

As shown in FIGS. 1 and 2, an application 116 installed on the mobile device 102 may communicate with the application server 106 to assist in the handling of the stored advertisements. Upon selection of the save option 204 of the advertisement 202, the application server 106 may cause the application 116 to display on the mobile device 102 a message 208 that confirms that the advertisement has been saved by the application 116 to the application server 106. For example, the message 208 may indicate "Thanks! The advertisement has been saved for later on the application." or a similar statement explaining that the advertisement has been saved for later access by the user. The message 208 may also include a download option 210. In one embodiment, the download option indicates "Download application." or a similar statement inviting the user to run the application 116. When the download option 210 is selected by the user, the application 116 is run on the mobile device 102.

When running on the mobile device 102, the application 116 may display an indication of the advertisements saved by the application server 106. The saved advertisements may be retrieved by the user when running the application 116. Upon provision of appropriate commands to the application 116, the application 116 causes the application server 106 to retrieve and download to the application 116 the advertisement or advertisements that the user desires to retrieve. The application 116 may display the saved advertisements on the mobile device 102 to the user.

In one embodiment, when running on the mobile device 102, the application 116 may maintain a display of an identifier for each advertisement stored in the application server 106 to represent the existence of the advertisement for the user. The identifier may include a brief description of or title for the associated advertisement. The identifier may serve as a convenient representation of the associated advertisement.

In one embodiment, the user interface of the application 116 may maintain a display of the identifiers for the saved advertisements in various configurations. For example, a configuration may include a listing of identifiers for all or some of the save advertisements. As another example, a configuration may include a listing of identifiers in an order based on the dates on which the associated advertisements were first displayed. As yet another example, a configuration may include a listing of identifiers based on the dates on which the advertisements were saved by the user. As yet another example, a configuration may include a listing of identifiers based on the dates on which the advertisements will expire. As yet another example, a configuration may include a listing of identifiers based on the value of the advertisements. As yet another example, a configuration may include a listing of identifiers for advertisements that the user has selected to be included in the listing. In one embodiment, a listing of identifiers may be displayed based on a combination of the foregoing configurations. In one embodiment, the configuration may be programmed or selectable by the user. In one embodiment, a configuration of a listing of identifiers may cause the application server 106 to organize the stored advertisements based on the configuration before providing the advertisements to the mobile device 102.

In one embodiment, the application 116 may allow the user to determine the number and the type of the identifiers for the advertisements to be listed. The user may select certain identifiers in the listing to cause the selected advertisements to be downloaded from the application server 106 to the application 116 and then displayed on the mobile device 102.

In one embodiment, the application 116 may maintain an identifier for one advertisement at a time. For example, the identifier for the advertisement that was last saved by the user may be displayed by the application 116. As another example, the identifier for an advertisement, such as a coupon, that will next expire may be displayed by the application 116. As yet another example, the identifier for an advertisement that is deemed to be most desirable to the user based on contextual parameters may be displayed by the application 116. Identifiers for other advertisements may be selectively displayed based on other considerations.

Figure 3:
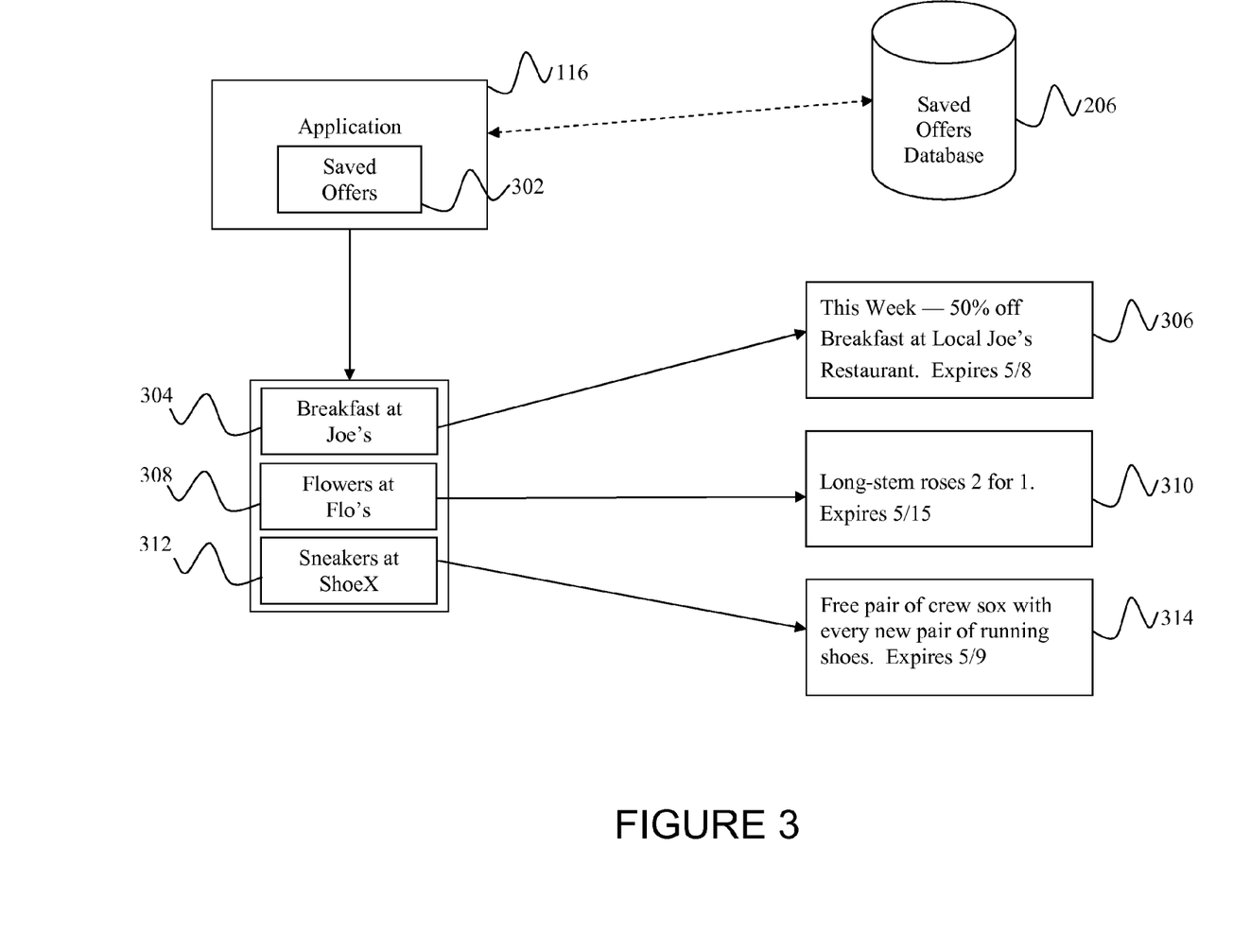
FIG. 3 is a functional diagram of one embodiment including a listing of identifiers for saved advertisements.

As shown in FIG. 3, the user interface of the application 116 may allow the user to retrieve saved advertisements in various ways. A listing 302 may be displayed by the application 116. The listing 302 may include identifiers for all or some of the saved advertisements saved in the database 206. The listing 302 includes an identifier 304 for an advertisement 306, an identifier 308 for an advertisement 310, and an identifier 312 for an advertisement 314. The identifier 304, "Breakfast at Joe's", describes the advertisement 306. The advertisement 306 is a fifty percent discount coupon for a restaurant "Joe's" that expires on May 8. The identifier 308, "Flowers at Flo's", describes the advertisement 310. The advertisement 310 is two-for-one discount coupon for long-stem roses sold at a flower shop "Flo's" that expires on May 15. The identifier 312, "Sneakers at ShoeX", describes the advertisement 314. The advertisement 314 is a coupon, which expires on May 9, for a free pair of crew socks when a new pair of running shoes is purchased at a shoe store "ShoeX". In one embodiment, the listing 302 may include more or fewer identifiers for advertisements saved in the database 206. In one embodiment, the identifiers in the listing 302 may be different from those shown. In one embodiment, the advertisements associated with identifiers in the listing 302 may be different from those shown.

The identifiers in a displayed listing 302 may be selected by the user. Based on commands of the user provided to the application 116, the identifiers may be individually selected, collectively selected, or selected in desired combinations. The application 116 then provides a command to the application server 106 to retrieve the selected advertisements. The application server 106 then downloads the selected advertisements to the application 116 for display on the mobile device 102 to the user. When the advertisements are coupons, the user may proceed to redeem the coupons in a manner appropriate for the coupons.

In one embodiment, the functionality of the application 116 may exclusively concern handling of stored advertisements.

In one embodiment, the functionality of the application 116 may inclusively concern handling of stored advertisements and also concern other functionality unrelated to stored advertisements.

In one embodiment, the functionality of the application 116 may involve the provision of an electronic, interactive business directory. The application 116 may allow the user of the mobile device 102 to search for listings in a geographical region or worldwide. The application 116 may allow the user to browse the listings by popular categories to find popular establishments, such as restaurants, bars, shops, services, and brands. The application 116 may display ratings and reviews to find the most suitable businesses in various categories of establishments. In one embodiment, the application 116 may allow the user to share important business details with others and save favorite businesses of the user. In one embodiment, the application 116 may be YPmobile® offered by AT&T® (YPmobile and AT&T are registered trademarks of AT&T Intellectual Property).

In one embodiment, the entity in control of the application server 106 is the same as the entity in control of the advertising network server 104. In one embodiment, the entity responsible for providing the application 116 is the same as the entity responsible for provision of the toolkit 114.

Figure 4:
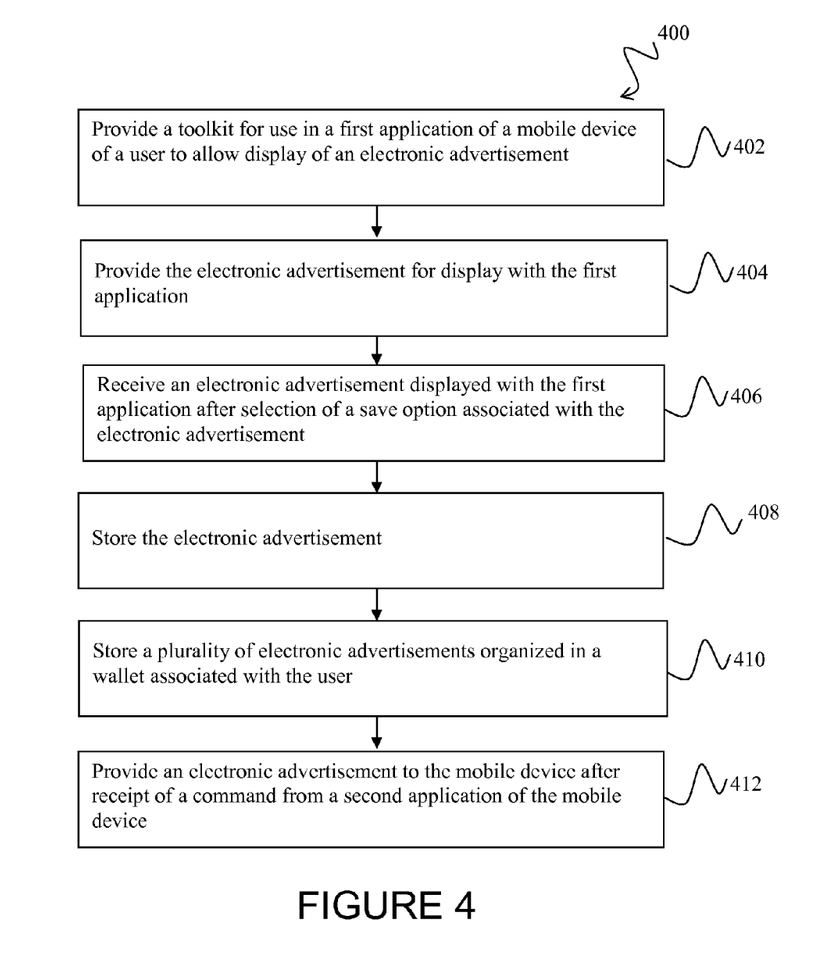
FIG. 4 illustrates a method of one embodiment for saving and providing advertisements.

FIG. 4 illustrates an exemplary method 400. In one embodiment, the method 400 is performed by an entity in control of the advertising network server 104 and the application server 106. A toolkit is provided 402 for use in a first application of a mobile device of a user to allow display of an electronic advertisement. The electronic advertisement is provided 404 for display with the first application. An electronic advertisement displayed with the first application is received 406 after selection of a save option associated with the electronic advertisement. The electronic advertisement is stored 408. A plurality of electronic advertisements is stored 410 organized in a wallet associated with the user. An electronic advertisement is provided 412 to the mobile device after receipt of a command from a second application of the mobile device.

In one embodiment, some of the steps of the method 400 are performed by the application server 116. In one embodiment, some of the steps of the method 400 are performed by the advertising network server 104.

In one embodiment, automatic reminders about saved advertisements may be provided to to the user based on the content of the advertisements. In one embodiment, content of the saved advertisements are analyzed. The content may be analyzed using any number of analysis techniques. In one embodiment, the application server 106 may analyze the content of the saved advertisements.

In one embodiment, reminders are provided by the application server 106 based on the content of the advertisements. Reminders may include, for example, alerts, updates, or any other type of notification about the saved advertisements. In one embodiment, reminders may be sent to the user through, for example, the mobile device 102. In one embodiment, reminders may be sent to other computing devices besides the mobile device 102. For example, the reminders may be sent to, for example, non-mobile computing devices, such as desk top computers associated with the user.

In one embodiment, the reminder may be sent to the user based on satisfaction of a predetermined rule. In one embodiment, the reminder may be sent based on satisfaction of a plurality of predetermined rules. If the predetermined rule is satisfied, the reminder may be automatically sent to the user. In one embodiment, the application server 106 may determine the predetermined rules. In one embodiment, the predetermined rules may be selected by the user, in whole or in part. In one embodiment, a reminder may be sent based on a combination of predetermined rules from both the application server 106 and the user.

In one embodiment, the predetermined rules may be stored in the application server 106. In one embodiment, the predetermined rules may be stored in the mobile device 102. In one embodiment, the predetermined rules may be stored in the application server 106 or the mobile device 102.

In one embodiment, a predetermined rule may consider various contextual factors to determine whether the predetermined rule is satisfied. The contextual factors may consider contextual and environmental conditions to determine the suitability of providing a reminder or to optimize the provision of the reminder so that the coupon to which the reminder relates is relevant to the user. In one embodiment, the predetermined rule may prioritize the contextual factors.

In one embodiment, the contextual factors may include a location of the user. A predetermined rule may provide that a reminder about an advertisement should be provided to the user if the user is within a certain geographic distance from the location of a merchant associated with the advertisement. For example, a coupon may be offered by a merchant doing business at a certain location. An exemplary predetermined rule may provide that, if the user is located within two miles of the location of the merchant, a reminder about the coupon will be sent to the user. Another exemplary predetermined rule may provide that, if the user is located within three miles of the location of the merchant based on the driving distance of the user, a reminder about the coupon will be sent to the user. Another exemplary predetermined rule may provide that, if the user is located within 20 minutes of the location of the merchant based on transportation (e.g., automobile) duration and route conditions of the user, a reminder about the coupon will be sent to the user.

In one embodiment, the location of the user may be determined by a number of techniques. For example, Enhanced 911 (E911) or a similar location identification system may be used to determine the location of the mobile device 102. As another example, an application capable of providing location determination, such as an application providing GPS functionality, may periodically and automatically provide the location of the mobile device 102 to the application server 106. As another example, the user may use an application on the mobile device 102 to allow the user to "check in" at times desired by the user to notify the application server 106 about the location of the user. In one embodiment, the techniques to determine the location of the user may be implemented, in whole or in part, by applications running on the mobile device 102.

In one embodiment, a contextual factor relating to a location of the user may involve setting up a geofence around the user. In one embodiment, a contextual factor relating to a location of the user may involve setting up a geofence around a merchant associated with an advertisement. When the user and the merchant are located within a certain radius of one another, a reminder about the advertisement may be sent to the user.

In one embodiment, the contextual factors may include an expiration date of the advertisement, such as a coupon. A predetermined rule may provide that a reminder about an advertisement should be provided to the user if the expiration date of the advertisement is within a certain temporal duration from the current time. For example, a coupon may be offered by a merchant that has specified an expiration date, after which the coupon may not be redeemed. An exemplary predetermined rule may provide that, if the expiration date of a coupon is within 24 hours from the current time, a reminder about the coupon will be sent to the user. Another exemplary predetermined rule may provide that, if the expiration date of a coupon is within two weekend days from the current time, a reminder about the coupon will be sent to user.

In one embodiment, the contextual factors may include a current time of day. A predetermined rule may provide that a reminder about an advertisement should be provided to the user if the current time of day is consistent with the temporal conditions of the advertisement. For example, a coupon may be offered by a merchant that has an express or implied temporal condition that must be met to redeem the coupon. An exemplary predetermined rule may provide that, if the coupon provides a discount for a breakfast order at a restaurant, a reminder about the coupon will be sent to the user only during breakfast hours for the restaurant. Another exemplary predetermined rule may provide that, if the coupon provides a discount for a breakfast order at a restaurant, a reminder about the coupon will be sent to the user during a time period preceding breakfast hours for the restaurant. Another exemplary predetermined rule may provide that, if the coupon provides a buy-one-get-one-free offer for winter clothing, a reminder about the coupon is will be sent to the user during the winter season.

In one embodiment, the contextual factors may include operating hours of a merchant associated with an advertisement. A predetermined rule may provide that a reminder about an advertisement should be provided to the user if the current time of day is during the operating hours of the merchant. For example, a coupon may be offered by a merchant that must be redeemed while the merchant is open for business. An exemplary predetermined rule may provide that, if the current time falls within the operating hours of the merchant, a reminder about the coupon will be sent to the user.

In one embodiment, other contextual factors may be considered.

In one embodiment, satisfaction of a predetermined rule may consider one contextual factor. In one embodiment, satisfaction of a predetermined rule may consider a combination of contextual factors.

In one embodiment, satisfaction of a predetermined rule may be based on binary determinations regarding the satisfaction of contextual factors. For example, an exemplary predetermined rule may provide that, if the coupon provides a discount for a breakfast order at a restaurant, a reminder about the coupon will be sent to the user only during breakfast hours for the restaurant. A reminder about the coupon will not be sent to the user during non-breakfast hours for the restaurant.

In one embodiment, satisfaction of a predetermined rule may be based on non-binary determinations, such as near or partial satisfaction of contextual factors. For example, an exemplary predetermined rule may provide that, if the coupon provides a discount for a breakfast order at a restaurant, a reminder about the coupon will be sent to the user during breakfast hours for the restaurant or within a certain time duration of the breakfast hours.

As another example, an exemplary predetermined rule may recognize that a coupon provides a discount for breakfast at a restaurant and expires on a certain day. The predetermined rule may provide a reminder about the coupon during breakfast hours for the restaurant. The predetermined rule also may provide a reminder about the coupon when the certain expiration date is within seven calendar days from the current time. The predetermined rule also may provide a reminder about the coupon if the current time is within a threshold amount from breakfast hours, if the current time is within a threshold amount from seven calendars days, or if both the current time is within a threshold amount from breakfast hours and the current time is within a threshold amount from seven calendar days.

In one embodiment, different types of reminders may be provided. For example, a reminder may be an email. As another example, a reminder may be a voice message. As another example, a reminder may be a text message. As another example, a reminder may be a calendar entry applied to a calendar application running on a device of the user. In one embodiment, the reminder may be provided to the user through an application running on the mobile device 102. In one embodiment, the application may be the application 116. In one embodiment, the type of reminder may be selected by the user.

In one embodiment, the reminder may include content to notify the user regarding the existence and details of the advertisement. In one embodiment, the content may notify the user about how to redeem a coupon. In one embodiment, the content may notify the user about the predetermined rule that caused the reminder to be sent.

In one embodiment, reminders may be sent to others besides the user. For example, the reminders may be sent to family or friends of the user based on a user preference. In one embodiment, the user may select the persons who will receive the reminders.

Figure 5:
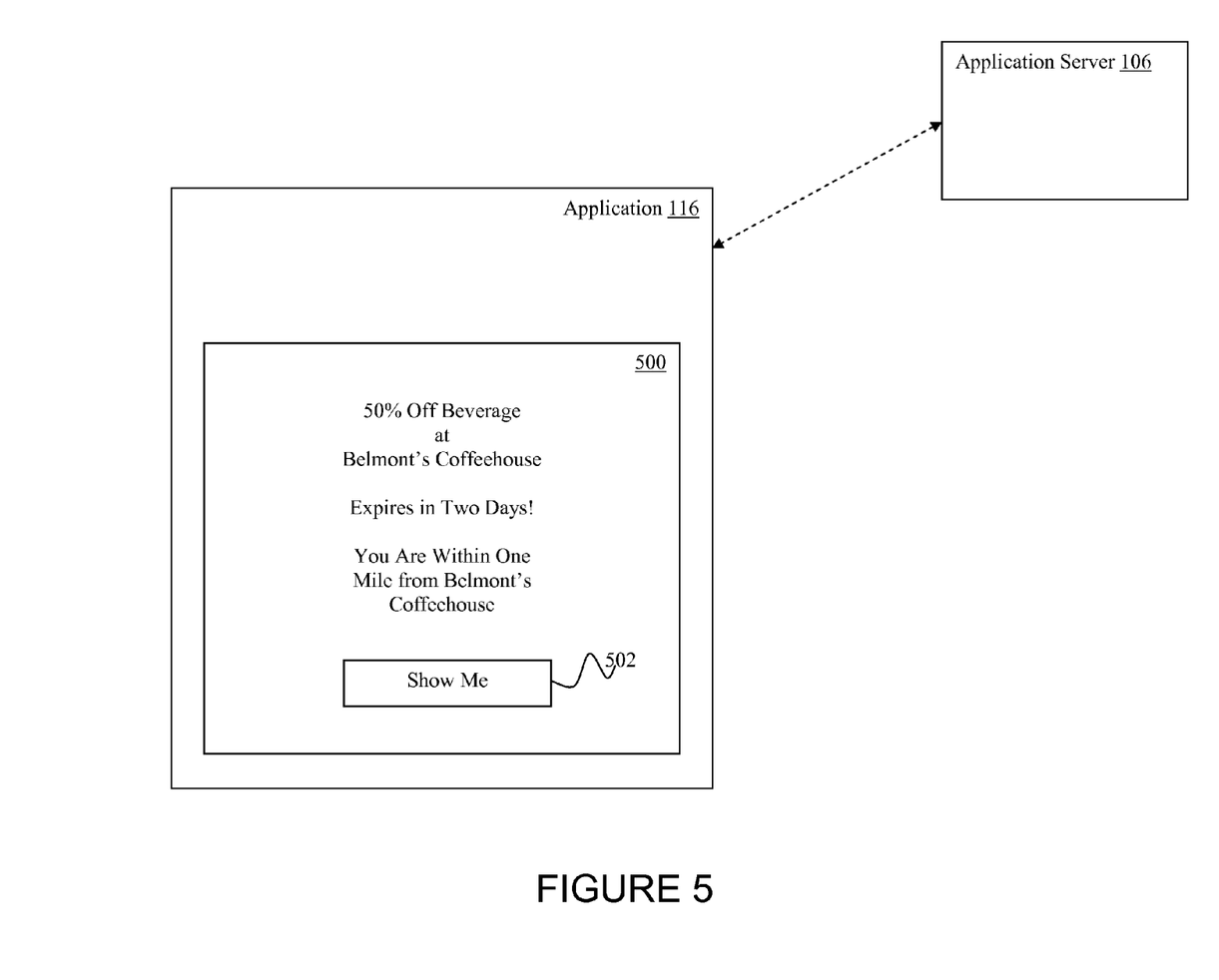
FIG. 5 is a functional diagram of one embodiment including a reminder about a saved advertisement.

FIG. 5 illustrates an exemplary reminder 500. The reminder 500 is associated with an advertisement saved by the user. The advertisement associated with the reminder 500 may be identified by the application server 106 based on analysis of the content of the advertisement and determination that a predetermined rule or predetermined rules have been satisfied. For example, the application server 106 may apply a predetermined rule to provide a reminder when both the current time is within two days from the expiration of the advertisement and the user is within one mile from a merchant associated with the advertisement. Upon determination of the satisfaction of the predetermined rule, the reminder 500 about the saved advertisement may be sent by the application server 106. The reminder 500 may be received by the mobile device 102 and displayed on the application 116.

The reminder 500 includes information about the associated advertisement. For example, the reminder 500 includes information that the advertisement is a coupon for a 50% discount off the price of a beverage at a merchant "Belmont's Coffeehouse". The reminder 500 further includes information about expiration of the coupon in two days. The reminder 500 further includes information that the user is within one mile from the location of the merchant.

The reminder 500 includes an exemplary display option 502. The display option 502 includes the term "Show Me" to invite the user to select the display option 502. In one embodiment, display options other than the display option 502 may be used. Upon selection of the display option 502, the application 116 communicates a request to the application server 106 to provide the associated saved advertisement.

Figure 6:
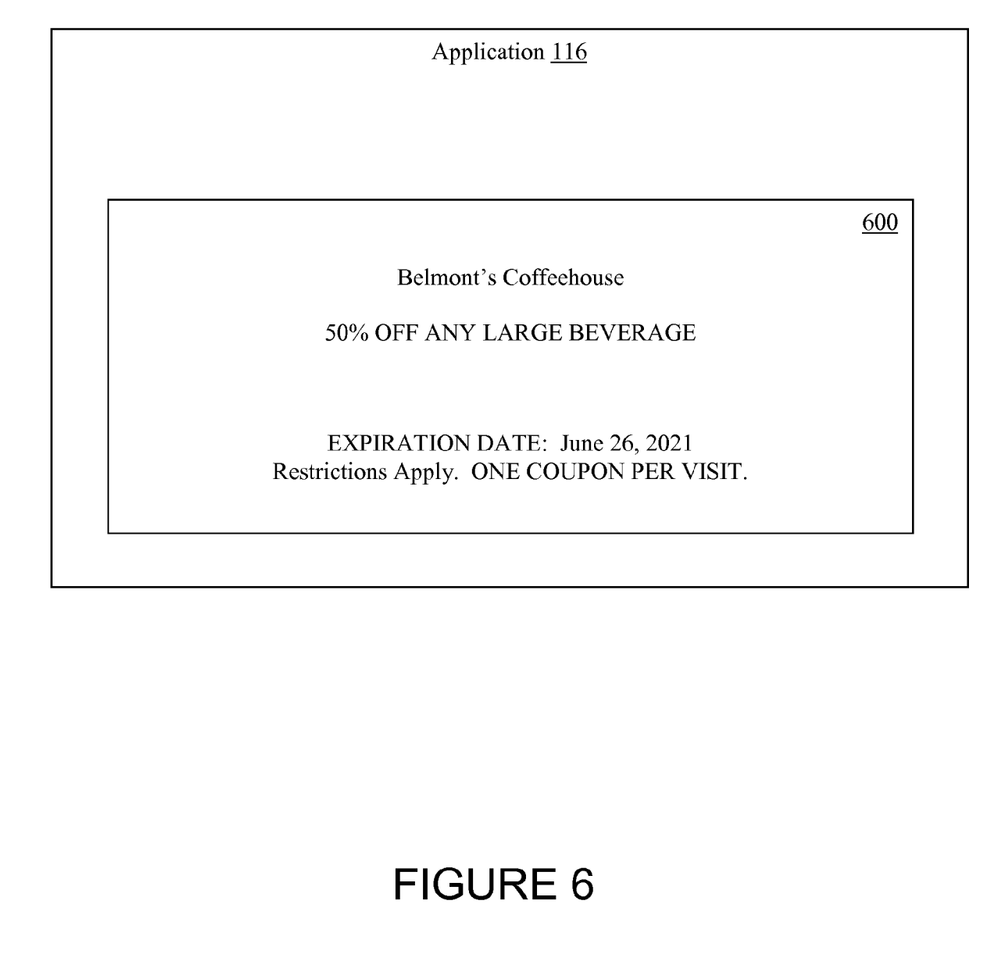
FIG. 6 illustrates a saved advertisement of one embodiment.

FIG. 6 includes an exemplary saved advertisement 600 provided by the application server 106 in response to selection by the user of the display option 502. The advertisement 600 may be displayed by the application 116. The advertisement 600 is a coupon. The advertisement 600 includes information that the merchant associated with the coupon is "Belmont's Coffeehouse" and that the offer is a 50% discount off the purchase of any large beverage. The advertisement 600 further includes information about the expiration date of the coupon on "Jun. 26, 2021". The advertisement 600 may include additional information about its terms and conditions.

Figure 7:
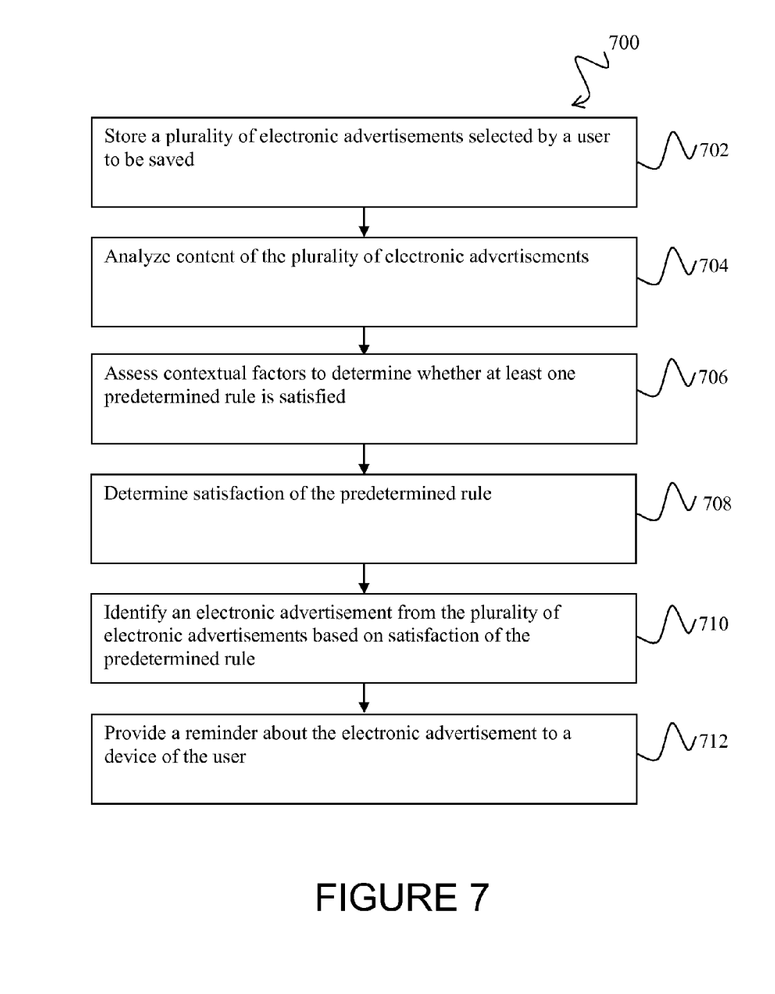
FIG. 7 illustrates a method of one embodiment for providing a reminder about a saved advertisement.

FIG. 7 illustrates an exemplary method 700. A plurality of electronic advertisements selected by a user to be saved is stored 702. Content of the plurality of electronic advertisements is analyzed 704. Contextual factors to determine whether at least one predetermined rule is satisfied are assessed 706. Satisfaction of the predetermined rule is determined 708. An electronic advertisement from the plurality of electronic advertisements based on satisfaction of the predetermined rule is identified 710. A reminder about the electronic advertisement is provided 712 to a device of the user.

Figure 8:
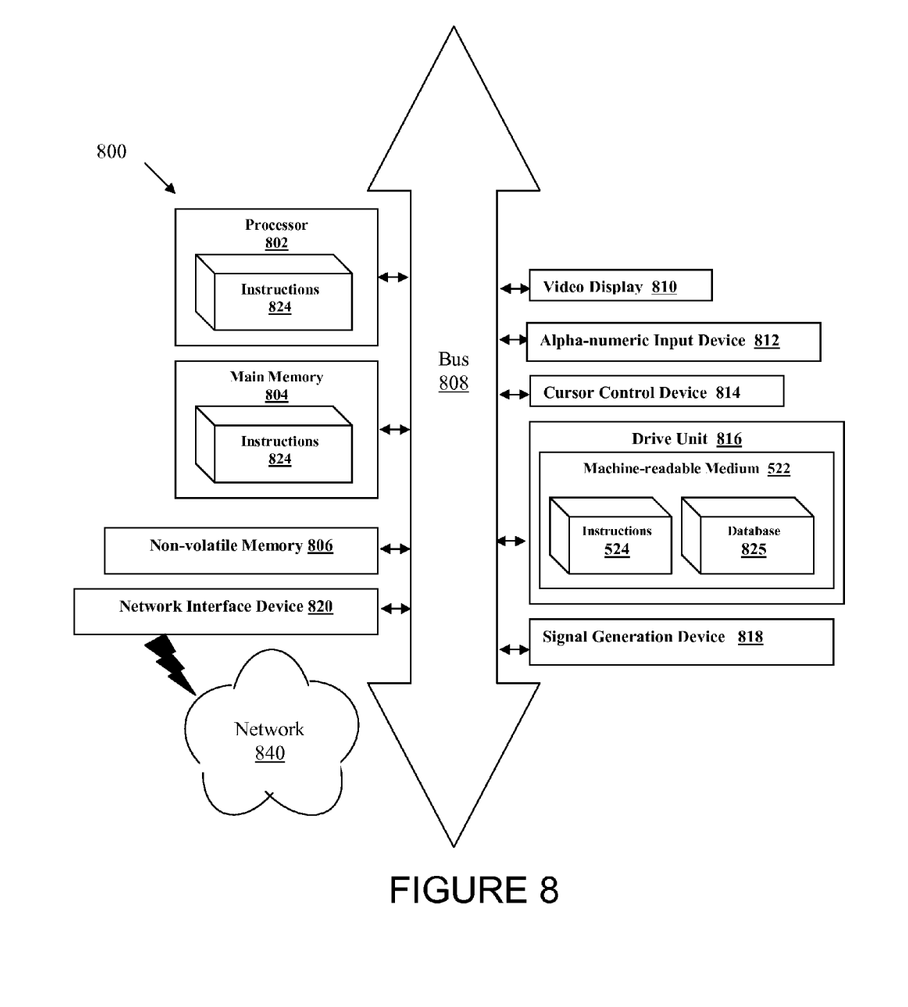
FIG. 8 is a diagrammatic representation of an embodiment of a machine, within which a set of instructions for causing the machine to perform one or more of the methodologies discussed herein may be executed.

FIG. 8 is a diagrammatic representation of an embodiment of a machine 800, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In one embodiment, the machine 800 is the mobile device 102 according to an embodiment as described herein. In one embodiment, the machine 800 is a component of the mobile device 102, such as one or more computers within the mobile device 102.

In one embodiment, the machine 800 is the advertising network server 104 according to an embodiment as described herein. In one embodiment, the machine 500 is a component of the advertising network server 104, such as one or more computers within the advertising network server 104.

In one embodiment, the machine 800 is the application server 106 according to an embodiment as described herein. In one embodiment, the machine 800 is a component of the application server 106, such as one or more computers within the application server 106.

The machine 800 includes a processor 802 (e.g., a central processing unit (CPU) a graphics processing unit (GPU) or both), a main memory 804 and a nonvolatile memory 806, which communicate with each other via a bus 808. In some embodiments, the machine 800 may be a desktop computer, a laptop computer, personal digital assistant (PDA) or mobile phone, for example. In one embodiment, the machine 800 also includes a video display 810, an alphanumeric input device 812 (e.g., a keyboard), a cursor control device 814 (e.g., a mouse), a drive unit 816, a signal generation device 818 (e.g., a speaker) and a network interface device 820.

In one embodiment, the video display 810 includes a touch sensitive screen for user input. In one embodiment, the touch sensitive screen is used instead of a keyboard and mouse. The disk drive unit 816 includes a machine-readable medium 822 on which is stored one or more sets of instructions 824 (e.g., software) embodying any one or more of the methodologies or functions described herein. The instructions 824 may also reside, completely or at least partially, within the main memory 804 and/or within the processor 802 during execution thereof by the computer system 800, the main memory 804 and the processor 802 also including machine-readable media. The instructions 824 may further be transmitted or received over a network 840 via the network interface device 820. In some embodiments, the machine-readable medium 822 also includes a database 825.

While the machine-readable medium 822 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

In general, the routines executed to implement the embodiments of the disclosure, may be implemented as part of an operating system or a specific application, component, program, object, module or sequence of instructions referred to as "programs." For example, one or more programs may be used to execute specific processes described herein. The programs typically comprise one or more instructions set at various times in various memory and storage devices in the machine, and that, when read and executed by one or more processors, cause the machine to perform operations to execute elements involving the various aspects of the disclosure.

Moreover, while embodiments have been described in the context of fully machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving, by a server system, a plurality of electronic advertisements from a mobile device, in response to one or more save advertisement commands, the server system not having previously provided the plurality of electronic advertisements to the mobile device, and the plurality of electronic advertisements having been displayed with a first application of the mobile device, wherein the first application is associated with a first entity;
storing, by the server system, the plurality of electronic advertisements;
analyzing, by the server system, content of at least one of the plurality of electronic advertisements;
assessing, by the server system, one or more contextual factors, wherein the one or more contextual factors comprise a time of day;
determining whether at least one predetermined rule is satisfied, wherein the at least one predetermined rule is associated with the one or more contextual factors;
identifying, by the server system, an electronic advertisement from the plurality of electronic advertisements based on satisfaction of the at least one predetermined rule associated with the one or more contextual factors; and
transmitting, by the server system, a reminder about the electronic advertisement to the mobile device based at least in part on the content and the satisfaction of the at least one predetermined rule associated with the one or more contextual factors, wherein the reminder is transmitted with a prompt to request retrieval of the electronic advertisement with a second application that is:
different from the first application of the mobile device,
is configured to facilitate retrieval of electronic advertisements, and
is associated with a second entity that is different from the first entity.

2. The method of claim 1 wherein the electronic advertisement is a coupon.

3. The method of claim 1 wherein the electronic advertisement is a display advertisement.

4. The method of claim 1 further comprising receiving a selection of the predetermined rule based on a user selection.

5. The method of claim 1 further comprising determining satisfaction of the predetermined rule, before the transmitting.

6. The method of claim 1 further comprising determining satisfaction of a plurality of predetermined rules, the plurality of predetermined rules including the predetermined rule, before the transmitting.

7. The method of claim 6 further comprising receiving a selection of the plurality of predetermined rules based at least in part on a user selection.

8. The method of claim 6 further comprising determining the plurality of predetermined rules without consideration of a user preference.

9. The method of claim 1 further comprising determining satisfaction of the predetermined rule based on non-binary determinations.

10. The method of claim 1 wherein the contextual factors further comprise one or more of a location of a user, an expiration date of the electronic advertisement, and operating hours of a merchant offering the electronic advertisement.

11. The method of claim 1 wherein the reminder is at least one from a group consisting of an email, a text message, a voice message, and a calendar entry provided to the mobile device.

12. The method of claim 1 wherein the reminder is a type based on a user selection.

13. A non-transitory machine-readable medium that provides instructions for a processor, which when executed by the processor cause the processor to perform a method comprising:
receiving a plurality of electronic advertisements from a mobile device in response to one or more save advertisement commands, without having previously provided the plurality of electronic advertisements to the mobile device, the plurality of electronic advertisements having been displayed with a first application of the mobile device, wherein the first application is associated with a first entity;
storing the plurality of electronic advertisements;
analyzing content of at least one of the plurality of electronic advertisements;
assessing one or more contextual factors, wherein the one or more contextual factors comprise a time of day;
determining whether at least one predetermined rule is satisfied, wherein the at least one predetermined rule is associated with the one or more contextual factors;
identifying an electronic advertisement from the plurality of electronic advertisements based on satisfaction of the at least one predetermined rule associated with the one or more contextual factors; and
transmitting a reminder about the electronic advertisement to the mobile device of a user based at least in part on the content and the satisfaction of the at least one predetermined rule associated with the one or more contextual factors, wherein the reminder is transmitted with a prompt to request retrieval of the electronic advertisement with a second application that is:
different from the first application of the mobile device,
is configured to facilitate retrieval of electronic advertisements, and is associated with a second entity that is different from the first entity.

14. The non-transitory machine readable medium of claim 13 wherein the electronic advertisement is a coupon.

15. A system comprising: at least one first computing device configured to:
receive a plurality of electronic advertisements from a mobile device in response to one or more save advertisement commands, without having previously provided the plurality of electronic advertisements to the mobile device, the plurality of electronic advertisements having been displayed with a first application of the mobile device, wherein the first application is associated with a first entity;
store the plurality of electronic advertisements;
analyze content of at least one of the plurality of electronic advertisements;
assess one or more contextual factors,
wherein the one or more contextual factors comprise a time of day;
determine whether at least one predetermined rule is satisfied, wherein the at least one predetermined rule is associated with the one or more contextual factors;
identify an electronic advertisement from the plurality of electronic advertisements based on satisfaction of the at least one predetermined rule associated with the one or more contextual factors; and transmit a reminder about the electronic advertisement to the mobile device based at least in part on the content and the satisfaction of the at least one predetermined rule associated with the one or more contextual factors, wherein the reminder is transmitted with a prompt to request retrieval of the electronic advertisement with a second application that is:

different from the first application of the mobile device, is configured to facilitate retrieval of electronic advertisements, and is associated with a second entity that is different from the first entity.

16. The system of claim 15 wherein the electronic advertisement is a coupon.

* * * * *